Oct. 28, 1969 E. MANOR 3,475,098
OPTICAL RANGE INDICATING SYSTEM
Filed Nov. 9, 1964 4 Sheets-Sheet 1

INVENTOR
ELI MANOR
BY *Benjamin J. Basil*
ATTORNEY

INVENTOR
*ELI MANOR*

BY
ATTORNEY

INVENTOR
ELI MANOR

BY Benjamin J. Barish
ATTORNEY

INVENTOR
ELI MANOR

United States Patent Office 3,475,098
Patented Oct. 28, 1969

3,475,098
OPTICAL RANGE INDICATING SYSTEM
Eli Manor, Tel Aviv, Israel
(1 Machutz St., Ramat-Chen, Israel)
Filed Nov. 9, 1964, Ser. No. 409,724
Int. Cl. G01c 3/08
U.S. Cl. 356—4  11 Claims

ABSTRACT OF THE DISCLOSURE

An automatic range-indicating method and system are described in which light rays from the scene are converged and the field of view of the scene is limited by an optical aperture so that light rays from all portions of the scene overlap in a predetermined space behind the optical aperture when the latter is located such that its effective aperture is at the image plane of the scene, producing homogeneous light in the said predetermined space, this space being examined for homogeneity of light to provide an indication thereby of the range of the scene.

---

The present invention relates to an optical range indicating method and system, an object of the invention being to provide a novel range indicating method and system which particularly lend themselves to automatic operation. The method and system of the present invention may also be used in non-automatic devices.

Most prior known range-indicating or range-finding systems are usually based on coincidence or on split image approaches or on finding the maximal contrast of the image. As far as I am presently aware, no automatic focusing system based on any of these approaches has gained widespread use. In reflex systems, sensing maximal contrast is employed but automatically determining maximum contrast is relatively cumbersome and not practically used.

In contrast to the systems based on the determination of maximum contrast to indicate range, the present invention is based on an approach involving the determination of minimum contrast.

The automatic determination of minimum contrast inherently may be accomplished more exactly and by the use of much simpler devices than the known methods for the automatic determination of maximum contrast, and therefore the invention provides a technique better lend-itself to automatic operation.

Briefly, according to the invention, an indication of the range of a scene is provided by locating optical converging means to receive light rays from the scene, and locating optical aperture means so as to receive light rays from the scene conveyed to it by at least part of the optical converging means with light rays from all portions of the scene overlapping in a predetermined space behind the optical aperture means when the latter is located so that its effective aperture is at the image plane of the scene. The optical aperture means when located as said produces homogeneous light in the predetermined space, and therefore it is only necessary to examine the preternmined space for homogeneity of light to provide an indication thereby of the range of the scene.

Thus, instead of examining for maximum contrast, an examination is made for homogeneous light, i.e. zero contrast, which as a practical matter is effected by examining for minimum contrast.

The invention makes use of the phenomenon that when the optical converging means and the optical aperture means are so related so that light rays from all parts of the scene pass through both and overlap in a predetermined space behind the optical aperture means, and when the optical aperture means is located so as to be effective at the image plane of the scene, then there is produced homogeneous light in the predetermined space behind the optical aperture means. The examination of the predetermined space for homogeneity of light may be by the human eye but preferably is by automatic-light-sensing means which is inherently more accurate.

A device constructed as described above may be used merely to indicate whether or not the scene is in a predetermined range, in other words to provide a "yes" or "no" indication. Such devices, however, would find greater applications in producing an indication or representation of the actual range of the scene. In the latter case, at least one of the mentioned optical means would be varied to vary the relation between the plane of the image of the scene and the effective plane of the optical aperture means so as to bring both planes to coincide. While varying the variable, the space of light homogeneity is examined. The condition of the variable existing when light homogeneity is found would thus provide an indication of the range of the scene.

Once the focal length and the image plane are known, the range of the scene can be determined from the lens formula, as expressed below:

$$1/f = 1/u + 1/v$$

Equation 1 wherein:

$f$ = the focal length of the optical converging means;
$u$ = the distance of the scene from the optically effective plane of the optical converging means; and
$v$ = the distance of the image plane from the optically effective plane of the optical converging means.

For example, the optical converging means may have a fixed focal length, and the relative distance between it and the optical aperture means may be varied and thereby provides the indication of the range when light homogeneity is found. Alternatively, the focal length of the opticla converging means may be varied to provide the indication of the range when light homogeneity is found.

The various features believed to be novel are defined in the appended claims, but it is believed that a better understanding of the overall invention and the several novel features thereof will be gained by reference to the accompanying drawings, in which:

Figure 8:
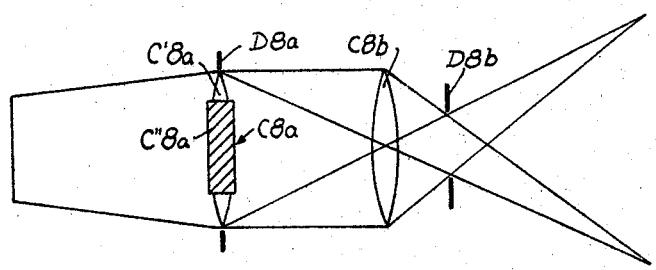
Figure 9:
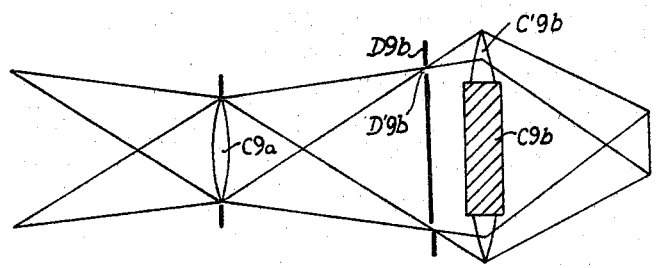
Figure 10:
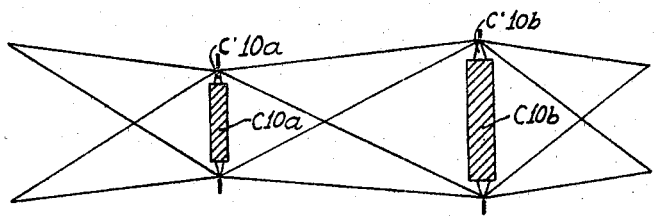

FIGS. 8-10 schematically illustrate variations in certain of these embodiments, which variations could be equally applied to the other embodiments; and FIGS. 11-14 schematically illustrate different possible arrangements for examining for light homogeneity.

Optical converging means (refracting or reflecting, simple or compound, or any combination) converge light rays coming from a finite object up to the plane of the image. A real image of the object is formed if the latter is before the first focal plane. At the plane of the image any point of the object has a conjugate point. Behind that plane, light rays from any point of the object diverge again forming "circles of confusion." The further they travel from the plane of the image, the more they diverge, and the "circles of confusion" of any point of the object grow larger.

As these circles of confusion grow larger, they begin to overlap with each other, thus blurring the image. The larger these circles become, the more will the image be blurred. In the case where the object is not too large or too near for a given optical converging means, then from a certain plane and onward, all these circles of confusion will have a common spot. At such a spot, a portion of each circle of confusion will overlap an equal portion of any other circle of confusion. All the light rays coming from the object will thus be in complete admixture, and each of its points will represent equally every point of the object. If the object and the aperture of the optical converging means are circular, then the spot will be circular as well.

Figure 1:
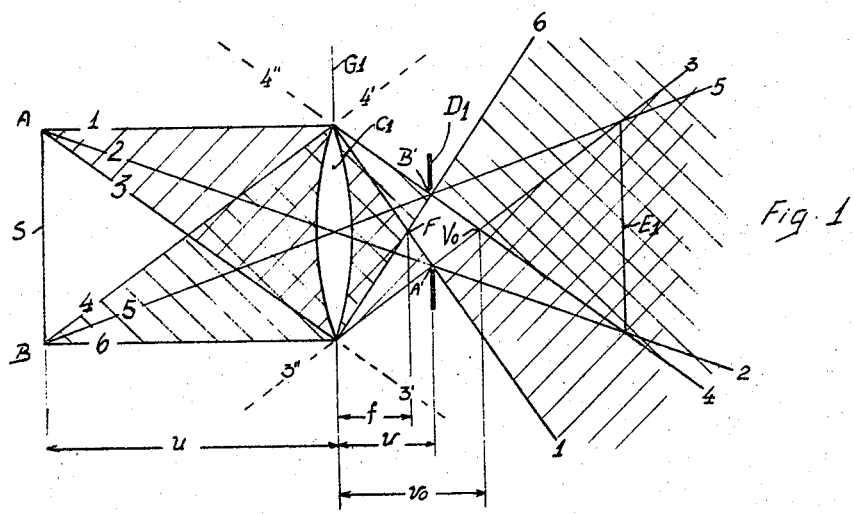
FIGS. 1 and 2 are optical diagrams schematically illustrating some of the main principles of the invention.

This can be better understood with reference to FIG. 1, wherein there is shown a finite object or scene S, the extreme points of which viewed by the optical system to be described are indicated by points A and B. These points emit a bundle of light rays, designated 1, 2, 3 and 4, 5, 6 respectively, which are received by an optical converging means, generally designated by lens C1, and are then transmitted to an optical aperture means, generally designated D1, located behind lens C1. Aperture D1 in this case is located so as to be effective at the image plane of the scene, as shown in FIG. 1. The focal length of the lens is indicated at F. The significance of these relationships will be discussed below.

It will be seen that the bundle of light rays from point A, represented by rays 1–3, form three cones of light: The first cone diverges as it approaches lens C1; the second cone converges as it leaves the lens and approaches the image plane occupied by aperture D1 where it focuses to its conjugate point A' at the bottom edge of aperture D1; and the third cone diverges again as it leaves the image plane, the base of the latter cone being at infinity. Similarly, the beam of light from point B, represented by rays 4–6, also forms three cones, the first diverging, the second converging, and the third diverging, the conjugate point B' being at the top edge of aperture D1 at the image plane.

In FIG. 1, the spaces occupied by the three cones of light from point A are cross-hatched in one direction, and the spaces occupied by the three cones of light from point B are cross-hatched in the opposite direction.

It will be noted from FIG. 1 that the two diverging cones of light from points A and B overlap in a predetermined space behind the image plane (aperture D1). This space is the one which is double-cross-hatched in FIG. 1, and it will be seen that it is bounded by ray 3 from point A and ray 4 from point B. Ray 3 is the most inwardly inclined ray from point A received by lens C1, and ray 4 is the most inwardly inclined ray from point B received by the lens. Thus, it will be seen that in this double-cross-hatched space there will be a complete admixture of light from both points A and B, and from all points in between.

In the arrangement of FIG. 1 this space of complete admixture of light from the finite object is in the form of a cone whose apex is at point $V_0$, determined by the intersection of rays 3 and 4. The base of the cone is at infinity. According to my computations, the distance of apex $V_0$ from the optically effective plane of the converging system (assuming that no stops interfere) is given by the following equation:

Equation 2

$$v_0 = quf/(qu-qf-yf)$$

wherein:

$v_0$=the distance between the optically effective plane of the optical converging means and the apex ($V_0$) of the cone where the light rays from the object come to be in complete admixture;
$y$=the size of the finite object;
$q$=the optically equivalent aperture of the optical converging means at its optically effective plane for a given distance of the finite object or scene;
$u$=the distance of the finite object or scene from the optically effective plane of the optical converging means; and
$f$=the focal length of the optical converging means.

In this equation, as well as in the other ones presented herein, the negative sign of the general formula of lateral magnification was omitted as rather absolute values need to be considered for practical purposes. This negative sign results from the recommendation of the Physical Society, London, 1934, when using a Cartesian system, and is arbitrary.

The optically effective plane of the optical converging means is the one where it is optically effective for light rays coming to its margins from the opposite margins of the object or scene which are the most inwardly inclined rays points A and B received by the optical converging means. This would be the primary focal plane if these rays chance to pass through the primary focal point. In FIG. 1 the optically effective plane is indicated by the line G1. Its location in another lens system will be described below, particularly with reference to FIG. 2.

The cross-section of the area of complete admixture of light (within the double-cross-hatched area in FIG. 1) at any plane perpendicular to the axis is given, according to my computations, by the following equation:

Equation 3

$$p = (quv' - quf - qv'f - yv'f)/uf$$

wherein:

$p$=the cross-section of the area where light rays emitted by the finite object or scene are in complete admixture; and
$v'$=the distance of the said area from the optically effective plane of the optical converging means.

The other designations are as in Equation 2.

It is thus seen that light emanating from points A and B, or any points in between, would be in complete admixture within the double-cross-hatched space in FIG. 1. In order for the light within this space to be completely homogeneous, it is necessary to exclude from this space all light except that coming from the finite object itself, i.e. between points A and B.

In accordance with the invention, this can be accomplished by introducing an optical aperture means which is effective at the plane of the image of the object. This optical aperture means is schematically designated by stop D1 in FIG. 1. As a practical matter, it can be a simple stop, a combination of stops effective at the desired plane, a lens whose rim acts as a stop, plane or spherical mirrors whose outer edges act as stops, or any combination of optical elements which provide an optically equivalent stop effective at the designated plane. When rims of spherical surfaces act as aperture settings, the optically effective and the principal planes and the focal length of the system, will change according to the laws of combination of two spherical surfaces. Any such optical aperture means will act as a field stop determining the angle of view, and so the field of view (the latter actually being the scene), which should be of the finite size of the object (according to its distance). After introducing a field stop, it is superfluous to speak about an object and it is adequate to mention the term scene. The size of the scene in FIG. 1 is set by points A and B at its extremities which are determined by their conjugate points A' and B', respectively, which are at the edges of aperture D1.

According to my computations, the size of the resultant homogeneous spot is given by the following equation:

Equation 4

$$p = (quv' - quf - qv'f - y'uv' + y'v'f)/uf$$

wherein: $y'$=the effective aperture of the optical aperture means. The other designations are as in the previous equations.

Variations in the distance of the scene require appropriate readjustments in the set-up, so as to bring the effective plane of the optical aperture means and the image plane to coincide. This may be achieved by varying the interspace between the optical aperture means and the optical converging means, or the focal length of the optical converging means, or any combination of these.

Thus, the double-cross-hatched space in FIG. 1 represents the space of light homogeneity, and by examining it, it can be determined whether the aperture D1 is at the image plane of the scene, as the light pattern shown in FIG. 1 is produced only under this condition. Any other position of the aperture will produce an uneven admixture of light from points A and B, and in between, and thereby not complete light homogeneity. The setting of the variable element would thereby provide an indication of the range of the scene, when light homogeneity is attained.

Testing for light homogeneity can be accomplished by merely positioning a screen, such as screen E1 in FIG. 1, at any location within the double-cross-hatched space in a plane perpendicular to the axis of the optical aperture means (aperture D1), and visually inspecting it. However, for purposes of accuracy, particularly for automatic operation, light homogeneity would normally be determined by using sensitive photocells or other light-sensing devices to examine for minimum contrast at a plurlity of points within the double-cross-hatched space in FIG. 1.

Some of the methods for testing for minimum contrast are described below, and it will be appreciated that testing for minimum contrast can be accomplished more accurately and with simpler equipment than testing for maximum contrast.

Automatic or non-automatic range finders can be constructed by varying at least one of the optical means in the foregoing equation to vary the relation between the plane of the image of the scene and the optical aperture means. The variable element would be calibrated according to the range of the scene. When light homogeneity is found within the double cross-hatched space in FIG. 1, the setting of the variable element would thereby provide an indication of the range of the scene.

Figure 4:
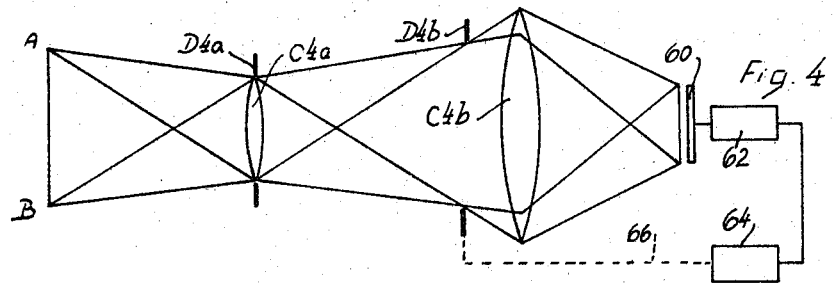
Figure 5:
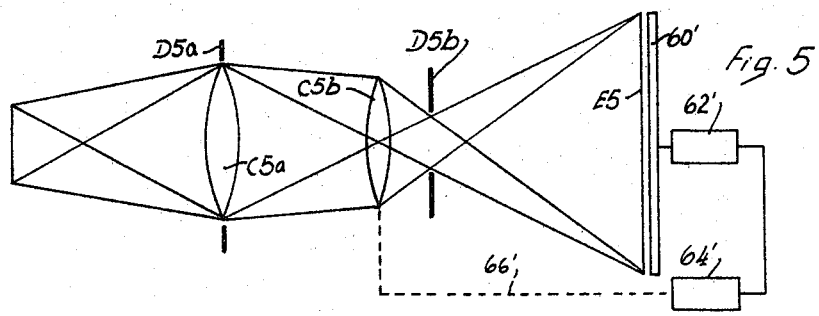

Preferably, the optical converging means has a fixed focal length, and the relative distance between it and the optical aperture means is varied and provides the indication of the range when homogeneity is attained (FIG. 4 to be described below); or the focal length of the optical converging means is varied and provides the indication of the range when homogeneity is attained (FIG. 5 to be described below).

Figure 6:
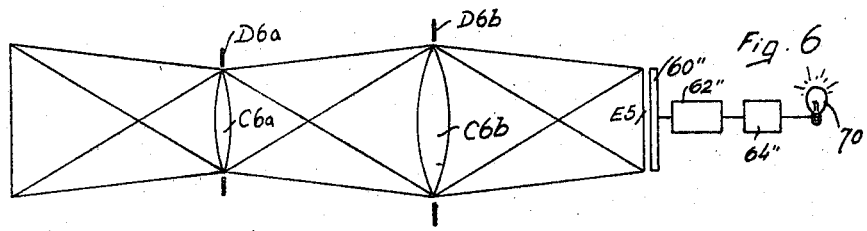

For non-automatic operation, as soon as light homogeneity is found this fact may be indicated by actuating a signal, such as a signal lamp (FIG. 6 to be described below). For automatic operation, the variable element would be continuously varied until light homogeneity is found, at which time it would be terminated. It will be appreciated that the finding of the presence or absence of light-homogeneity, indicating the range of the scene, can be used for other purposes, such as for controlling an external device.

Returning to FIG. 1, it is seen that a condition necessary to be met in order to produce homogeneous light in the double-cross-hatched space, besides the condition that the optical aperture must be located so that its effective aperture is at the image plane of the scene, is that light rays from all portions of the scene must overlap in a space behind the optical aperture means. As shown by the optical diagram in FIG. 1, this condition is met in the arrangement illustrated in FIG. 1. If, however, the aperture of the optical converging means (i.e. the rim of lens C1) were smaller or equal to the size of aperture D1, then light rays from points A and B (or any points in between) would never overlap behind the aperture, since the most inwardly inclined ray 3 from point A and the most inwardly inclined ray 4 from point B would diverge behind aperture D1, or at best be parallel, but would never converge and cross each other as shown in FIG. 1.

Figure 2:
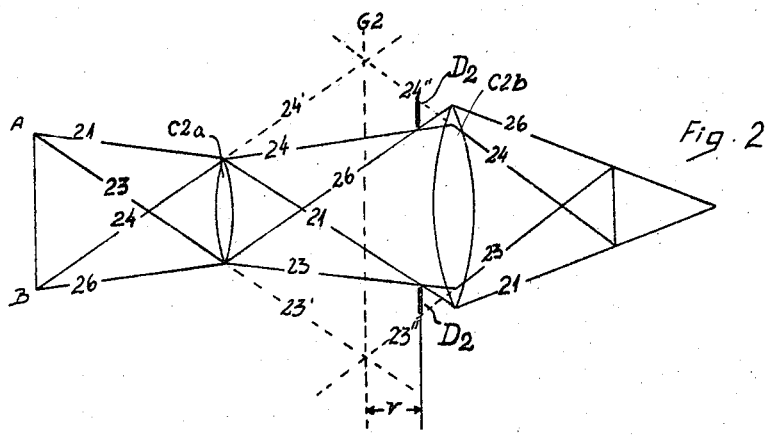

In a simple optical system such as shown in FIG. 1, this condition may easily be met by merely making lens C1 of larger aperture than aperture D1, assuming no other stops interfere. FIG. 2 will help to explain how this condition would be met in a more complicated optical system.

FIG. 2 schematically illustrates an optical system in which the optical converging means comprises a pair of spaced lenses C2a and C2b, with the aforementioned aperture D2 disposed between the two lenses. (The FIG. 2 arrangement is basically the same as illustrated in FIG. 4, and another aspect of that arrangement will be described below with respect to FIG. 4.) In FIG. 2, however, it is to be noted that the first lens C2a of the optical converging means is of smaller aperture (determined by its rim) than aperture D2. Nevertheless, as explained below, this system will also produce an overlapping behind aperture D2 of light rays from points A and B of the scene, to enable the formation of a space of homogeneous light when the aperture D2 is located so that its effective aperture is at the image plane of the object.

In FIG. 2, the optically effective plane of the optical converging means is indicated by the line G2, and it will be seen that this line represents the plane of intersection of incident rays 23 and 24 and their backward extensions 23' and 24' with their emerging rays 23 and 24 and their forward extensions 23" and 24". Light rays from points A and B will overlap behind aperture D2 when that aperture is smaller than the distance between the foregoing points of intersection at plane G2. Thus, it can be said that the condition for producing overlapping behind the aperture D2 of light rays from points A and B of the scene, which is necessary to enable the formation of a light homogeneous space behind the aperture when the aperture is located at the image plane of the scene, is met when the optical aperture means D2 has an optically equivalent aperture smaller than that of the optical converging means (lenses C2a and C2b) at the plane of intersection G2 of the most inwardly inclined incident rays 23 and 24 and their straight projections 23' and 24' with their own emerging rays 23 and 24 and their straight projections 23" and 24".

It will be seen that this latter condition is also met in FIG. 1. Here, the plane of intersection, indicated by the reference G1, is at the points of intersection of the most inwardly inclined incident rays 3 and 4 and straight backward extensions 3' and 4' with their emerging rays and straight forward extensions 3" and 4".

In other words, this plane, termed as the optically effective plane of the optical converging means, is the plane where the straight direction of the most inwardly inclined incident rays emanating from the scene and passing through the optical converging means intersect with the straight direction of their emerging rays. As this plane's exact position depends on the range of the scene, it could vary with variations of the latter's range.

With further reference to FIG. 1, it will be seen that after the introduction of the optical aperture means (aperture D1), each plane through the space of homogeneous light (the double-cross-hatched space) will produce a non-homogeneous space (the single cross-hatched space) surrounding the homogeneous space. The homogeneous space represents the portion of each circle of confusion which overlaps with all other such circles, and it will be surrounded by those portions of the circles of confusion which do not overlap with all others. If this outer, non-homogeneous space is to be eliminated, it is necessary to introduce another aperture system.

Any combination referred to above with respect to the optical aperture means represented by aperture D1 may be used for this further aperture system. Its purpose and arrangement is to bring all chief rays to meet and cross the axis at the desired plane where the screen, or other light-sensing means, would be located. Therefore, it should be in a plane whose image is at the plane where the screen or other light-sensing means is to be positioned. Hence, it would be before the optically effective plane of the optical converging means. The light sensing means will have to be within the limits of the image of this aperture.

Figure 3:
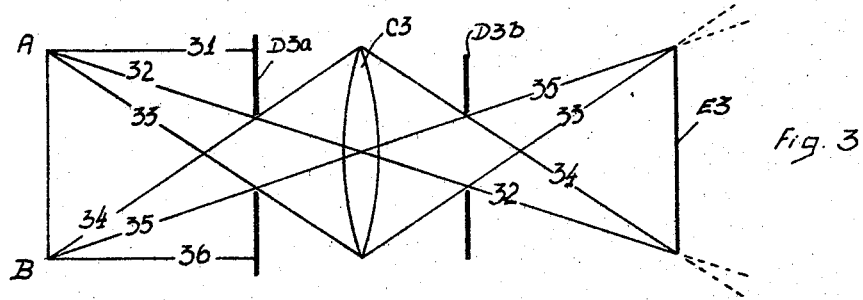
FIGS. 3-7 are optical diagrams schematically illustrating, for purposes of example only, a number of embodiments of the invention.

FIG. 3 schematically illustrates such an arrangement where a stop, herein called an anterior aperture, is introduced for purposes of eliminating the non-homogeneous light surrounding the homogeneous light where the screen or light-sensing means is to be located. In FIG. 3, the optical converging means is represented by lens C3, and the previously mentioned optical aperture means is represented by aperture D3b. The newly included aperture for purposes of removing the non-homogeneous light is represented by aperture D3a. It will be seen from this figure that when aperture D3a is located at a plane where its image is at the plane of the screen or light-sensing means E3, the light rays between rays 31 and 32 from point A, and between rays 35 and 36 from point B, will be blocked by aperture D3a and therefore will not appear behind aperture D3b. Thus, by positioning screen E3 at the plane of intersection of light rays 33 and 35, and 32 and 34, which represents the image plane of aperture D3a, the only light that will be intercepted by this screen will be homogeneous light, the non-homogeneous light being eliminated.

This arrangement would increase the sensitivity of the system since it eliminates all those light rays which do not create homogeneity and which could adversely influence the light-sensing devices by reflection, etc.

The interrelationships of the focal length, interspaces, and apertures of the system illustrated in FIG. 3 are set forth in the following equation:

Equation 5

$$q = (p'u + yu')/(u - u') = (p'uf + y'uu' - y'u'f)/(uf - u'f)$$

wherein:

$p'$ = the effective aperture of the anterior aperture setting; and $u'$ = the distance from the plane where the anterior aperture setting becomes effective to the optically effective plane of the optical converging means.

The other designations are as in the previous equations.

These interrelationships are of importance because the minimal aperture of the optical converging means has to be set by them according to the desired range, as no interference by the aperture of the optical converging means may be permitted.

In such an arrangement, light coming from a plane a certain distance from it will come into complete admixture giving rise in another plane to one all-over homogeneous spot. In this spot, contrast will be zero, irrespective of the contrast of the scene, and the admixture of the light emitted by it is complete. This is opposite to the plane of the image of the scene, and may be defined as its "anti-image." In the manner a scene is brought into focus by producing its image, it can be said that the scene is brought into "anti-focus" by producing its "anti-image." In order to bring the scene into anti-focus, the effective plane of the posterior aperture (represented by aperture D3b in FIG. 3) has to be in focus for it. This aperture corresponds to the previously described optical aperture means and will frequently be referred to hereinafter by the designation posterior aperture, to distinguish from the anterior aperture D3a. In its capacity as a field stop, it should limit the angle of view so that only that part of a scene which is in about the same plane (allowing for an adequate depth of field) would be in view for the system. Otherwise, those parts of the scene not in a proper plane will produce irregularities and the spot will not be homogeneous.

This set-up is comparable to arrangements including an aperture stop or entrance pupil, a field stop, and an exit pupil, wherein the anterior aperture is the aperture stop, the posterior aperture is the field stop, and the screen or the plane of the light sensing means is the exit pupil.

The optical converging means could include an anterior converging sub-system and a posterior converging sub-system, the anterior converging sub-section serving mainly to focus the scene onto the effective plane of the posterior aperture (corresponding to aperture D3b in FIG. 3), and the posterior converging sub-system serving mainly to focus the effective plane of the anterior aperture (aperture D3a) onto the plane within the predetermined space (screen E3) examined for homogeneity of light. FIGS. 4–6 illustrate various such arrangements. In all these illustrated arrangements, the optically effective plane of the anterior converging sub-system coincides with the effective plane of the anterior aperture, but it will be appreciated that this is not necessary.

In FIG. 4, the anterior converging sub-system is represented by the lens C4a, and the posterior converging sub-system is represented by the lens C4b. The rim of lens C4a acts also as the anterior aperture, represented by numeral D4a, so that the aperture setting plane of the anterior converging sub-system coincides with the effective plane of the anterior aperture. Also in the FIG. 4 arrangement, aperture D4b (corresponding to aperture D3b in FIG. 3) is positioned between the two converging lenses C4a and C4b, so that the posterior converging sub-system is behind the effective plane of the posterior aperture.

According to my calculations the inter-relationships of the apertures and interspaces of the two converging sub-systems in this case are set forth by the following equation:

Equation 6

$$p'st - p'st_1 - p'tf_1 + y'st - y'tf_1 - 1sf_1 = 0$$

wherein:

$s$ = the distance of the scene from the plane where the anterior aperture setting becomes effective;

$t$ = the interspace between the plane where the anterior converging sub-system's aperture becomes effective and the optically effective plane of the posterior converging sub-system;

$1$ = the minimal optically equivalent aperture allowed for the posterior converging sub-system at its optically effective plane for an object at a certain distance from the device; and $f_1$ = the focal length of the anterior converging sub-system.

The other designations are as in the previous equations.

In FIG. 5, the posterior aperture represented as D5b is located behind the posterior converging sub-system represented by lens C5b, so that the posterior converging sub-system is before the effective plans of the posterior aperture. In this figure, the anterior converging sub-system is represented by lens C5a, and the anterior aperture, represented by stop D5a, is constituted by the rim of the lens. According to my calculations, the interrelationships in this arrangement are given by the following equation;

Equation 7

$$p'f_2(sd - sf_1 - df_1) + y'd(sd - sf_1 - sf_2 - df_1 + f_1f_2) + 1sf_1f_2 = 0$$

wherein:

$d$ = the interspace between the plane where the anterior converging sub-system's aperture becomes effective and the optically effective plane of the posterior converging sub-system; and $f_2$ = the focal length of the posterior converging sub-system.

The other designations are the same as in the previous eguations.

These relationships are of importance because there should be no interference by apertures other than required.

FIG. 6 illustrates the arrangement where the posterior aperture D6b is constituted by the rim of the posterior converging lens C6b, so that the optically effective plane of the posterior converging sub-system coincides with the effective plane of the posterior aperture. In this arrangement, the anterior aperture D6a is constituted by the rim of the anterior lens C6a, as in FIGS. 4 and 5. No further stops are needed as the apertures of the converging subsystems serve the purpose. The anterior converging subsystem (lens D6a), produces the image of the scene at the optically effective plane of the posterior converging sub-system (lens C6b), and the latter sub-system forms an image of the effective aperture of the anterior converging sub-system upon the screen E5 or other light-sensing means. The "anti-image" of the scene is thus produced on screen E5. In order to bring the scene into "anti-focus," the device would have to be calibrated by focusing the scene upon the optically effective plane of the posterior converging sub-system (lens C6b) and that of the anterior converging sub-system (lens C6a) upon the screen. When the distance of the scene changes and its image ceases to form at the appropriate plane of the posterior converging sub-system, the spot will cease to be homogeneous, and the device needs recalibration.

Anti-focusing by focusing both variables can be accomplished either by varying the interspaces in the device, or by accommodating the focal lengths of the converging sub-systems. If adapting the distances between the components of the devices is preferred, these may be calculated by Equations 8 and 9 below, which can be derived from each other:

Equation 8

$$1/s' = 1/f_1 - 1/s = 1/f_2 - 1/s''$$

wherein:

$s'$ = the distance between the planes where the two aperture settings become optically effective; and $s''$ = the distance of the plane of the anti-focus from the plane where the posterior aperture becomes effective.

The other designations are as in the previous equations.

Equation 9

$$s'' = s'f_2/(s'-f_2) = sf_1f_2/(sf_1 - sf_2 + f_1f_2)$$

All designations are found in the previous equation.

With the variations of the interspaces between the components of the device, the size of the anti-focus spot changes. Its size may be calculated by the laws of magnification, and according to my computations, by the equation below:

Equation 10

$$p = p's''/s' = p'f_2/(s'-f_2) = p's''/f_2 - p'$$
$$= (p'sf_2 - p'f_1f_2)/(sf_1 - sf_2 + f_1f_2)$$

All the designations appearing in this equation are set forth in the earlier equations.

Figure 7:
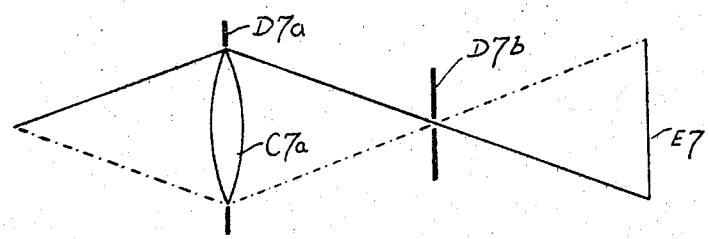

The posterior aperture, which determines the angle of view of the apparatus, could be extremely small, or even of pin-hole size. This is illustrated in FIG. 7, the system being used to determine the range of a single point only. Such a pin-hole aperture could replace the posterior converging sub-system in the FIG. 6 arrangement. Besides the pin-hole aperture D7b, the system need include only a converging lens C7a, whose rim constitutes the anterior aperture D7a. No additional stops are required. In this set-up, the size of the homogeneous spot can be kept unchanged by maintaining a constant relationship of the distances between the optically effective plane of the optical converging means and the pin-hole stop, and that of the latter and the screen E7.

All of the schemes for producing anti-images could be reversed whereby the scene is located in the place of the anti-image and the latter is located in the place of the former, excepting the arrangement of FIG. 7. This is mainly of importance when considering the arrangements illustrated in FIGS. 4 and 5, which could be reversed so that the light is emitted at the right and travels to the left. Such a device could be adjusted to scenes at varying distances solely by changing the distance between its anterior converging sub-system and its other components. Naturally, both aperture settings could be separate from the two converging sub-systems.

In testing for homogeneity, it is only necessary to examine a plurality of relatively small discrete areas for minimum, ideally zero, contrast. A number of systems that might be used are illustrated and described below with respect to FIGS. 11–14. Light rays not conveyed to the small discrete areas actually examined are therefore redundant and may be eliminated, as for example by the optical converging means or the aperture settings.

In any combination of converging and aperture means capable of producing an anti-image, the homogeneous spot will start losing its homogeneity most prominently at its outer margin as the scent moves out of anti-focus. Therefore, to determine if a scene is in anti-focus, testing only the most lateral portion of the homogeneous spot normally suffices and is usually preferable.

FIG. 8 illustrates a variation in the FIGS. 3–7 arrangements for purposes of eliminating all or a part of the light which is actually not sensed by the light-sensing means. Here, the anterior converging sub-system lens C8a is formed with a lens segment C'8a only at the most lateral portion of the lens bordering on the anterior aperture D8a (constituted by its rim), and the remainder of the lens C"8a is made of any suitable supporting material, which is preferably opaque. The lens segment C'8a may be constituted of a continuous annulus, or of merely discret lens elements arrayed in a circle. In either case, the lens C8a will block out all the light from the scene except that passing through the lens segment C'8a. In the FIG. 8 arrangement, the posterior converging sub-system lens C8b and the posterior aperture D8b are both as described earlier, so that they exert the same effects on the light rays which actually pass through lens C8a.

In all the above-described devices excepting that with the pin-hole aperture, only the outer rim of the scene, as seen by the device according to its angle of view, is anti-focused. This is usually good enough, just as focusing in split image range finders is achieved by aligning two images along one line. But if desired, to increase the length of the line of the scene which is brought into antifocus it can be composed of several lines. This can be accomplished by substituting simple field stops with a series of slots, for instance a series of circular slots to produce an effect of multiple concentric stops, so that the mechanism produces several rims. This would be like employing several anti-focusing devices, all making use of the same optical converging means. The proper relations of these apertures and the rest of the device would be calculated by the appropriate equations. However, care is to be taken that they do not interfere with each other.

FIG. 9 illustrates such a variation where the posterior aperture D9b is slitted (slit D'9b) to transmit only the portions of the light, whether they be only the most lateral portions and/or small discrete portions of the scene, which are sensed in this variation. Here the posterior converging sub-system C9b is formed with lens segments C'9b only. Actually, this is like shaping the scene into various shaped forms, or spiltting it up into multiple scenes.

As indicated earlier, only those rays emitted by the rim of the scene, as determined by the device's angle of view, contribute to anti-focusing (excepting FIG. 7). At the same time, mainly those portions of the converging systems which convey light rays from the margins of the scene to the margins of the spot are of major importance. The other portions of the converging systems do not contribute much to anti-focusing, so they may be eliminated or employed for other purposes. Their elimination from the anti-focusing device can increase the latter's accuracy as well. Also, by eliminating mostly the central parts of the converging systems, one can produce the equivalent of extremely long focus converging systems with extremely wide apertures, as well as many types of range finders. Further, the costs may be considerably reduced.

The variations described in FIGS. 8 and 9 can be combined into one set-up wherein both the anterior and the posterior apertures are slotted. This combination is most practicable for the set-up described in FIG. 6.

FIG. 10 illustrates a set-up similar to that of FIG. 6, but wherein both lenses C10a and C10b are proivded with lens segments C'10a and C'10b for transmitting only those portions of the light actually examined and only from certain portions of the scene. All the non-examined portions are thus blocked. This can increase the device's accuracy, as well.

It will be appreciated that using lens segments and/or aperture silts may be applied to any of the arrangements illustrated in FIGS. 1–7.

Spherical surfaces converge or diverge light rays in two dimensions, that is, in all planes which include the axis of the surface. Optical systems converging light rays in one or several directions only would be adequate for range finding devices of these types on condition that they measure the light intensity differential not of spots, but along lines included in the converging planes only. Cylindrical converging surfaces may be employed for convergence in a single plane, and multiple cylindrical converging surfaces, in several directions; or surfaces cylindrically shaped in diverse directions, may be employed for systems converging in more than one, but not all of the planes including the axis. Measuring the light intensity at the extreme ends, that would be in pairs when convergence is in one plane only, generally suffices. Otherwise, all said above about the devices with a two dimensional converging system applies also for devices with optical systems converging in one or several planes. Usually, the light intensity differential of several pairs of points must be measured in order to obtain satisfactory results. Only the light emitted by the edges of the scene, as seen by the device, and mainly the light at the extremities of the screen, are of importance for range finding, as mentioned previously for the systems converging in two dimensions. Therefore, here as well, only those portions of the converging systems conveying light from the verges of the scene to those of the screen need to be incorporated in the device. In other words, only the outermost parts of these systems need be included in such a device.

This allows for substituting the cylindrical converging systems, entirely or partially, depending upon the combination, by plane mirrors or prisms. When there are two converging sub-systems each of which coincides with one of the apertures (the anterior and posterior) then all cylindrical surfaces may be replaced by plane ones. Similarly, in two dimensional systems, optical converging means equivalent to a portion of a cone shaped surface could be used.

Anti-focusing will be accomplished in any of the devices by bringing the scene to focus on the effective plane of the posterior aperture and simultaneously, when there is an anterior aperture, by bringing it to focus upon the screen or other like-sensing means. In some devices, there is a combination of converging subsystems which remains constant, whereas in others it varies as described. When the combination of converging sub-systems remains constant and so do the sub-systems themselves, only the position of the effective plane of the posterior aperture in relation to the image plane must change until they coincide, for anti-focusing. When there are two converging sub-systems, the interspace between them varying according to the distance of the scene, there should be coordinated movement of all moving parts. Both the distance between the posterior aperture and the light sensing means, and the size of the area examined for homogeneity of light, could vary. Many different mechanisms could be employed to attain such coordinated movements while adjusting the device to varying distances. As many known diverse types of such mechanism could perform the required differential coordinated movements, they are not discussed herein.

In the example given in FIG. 6 the adjustment of the device to scenes of varying distance could be performed in several ways. One way is by changing the interspace between both converging sub-systems and concomitantly varying the distance of the screen or light sensing means and possibly also its size. A second way is by changing the focal length of the anterior converging sub-system. Another way is by changing the interspace between the converging sub-systems as mentioned, but at the same time changing the focal length of the posterior one so as to keep the anterior one in focus upon the screen.

In many of the devices the optical converging means or part of it, like the anterior converging subsystem, can be employed concomitantly as a taking lens of a still, movie or television camera.

FIGS. 11–14 schematically illustrate various examples of arrangements for examining for light homogeneity. Many others are feasible as well. Generally speaking, if homogeneity of light is not examined by the eye there should be light-sensing means for sensing the light at different portions in the predetermined space where homogeneity is being sought. These light-sensing means could be made to generate electrical signals in response to the light intensities sensed. The systems also include some form of analysing means for analysing the electrical signals for equality, and control means actuated in response to the analysing means.

Figure 11:
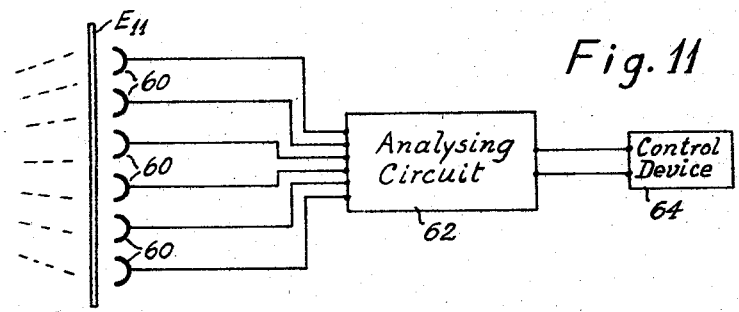

With reference to FIG. 11, the light-sensing means therein shown comprises a plurality of fixed photocells 60 which sense the light intercepted from the screen E11 located as described above in the space of homogeneous light behind the posterior aperture of the optical system. If desired, and it would be preferable in many cases, screen E11 is completely omitted, and the photocells themselves intercept the light directly. The photocells 60 generate electrical signals in accordance with the intensity of the light intercepted and transmit the electrical signals to an analysing circuit 62. The latter circuit analyses these signals for equality, and controls a control device 64 as a result of its analysis.

As indicated earlier, the device may be such that the focal length of the optical converging means is fixed, and the relative distance between same and the optical aperture means is variable and provides the indication of the range when homogeneity is attained. This arrangement is schematically illustrated in FIG. 4, but is applicable to all the various devices including all the figured examples. In it the light-sensing means 60 transmits its signals to the analysing circuit 62 which in turn controls a control device 64, the latter, by means of a connection schematically illustrated as 66, controlling the movement of the optical aperture D4b. The aperture is caused to move, and when light-sensing means 60 finds that the light is homegeneous, control device 64 terminates the movement of the aperture. Similarly the anterior converging sub-system could be moved, leaving both apertures fixed.

The arrangement where the focal length of the optical converging means is variable and is controlled, is schematically illustrated in FIG. 5, with the understanding that this could be done in the other cases as well. In this arrangement, when light homogeneity is found by light-sensing means 60' and analysing means 62', control device 64' is actuated to discontinue the varying of the focal length of the optical converging means.

FIG. 6, for example, schematically illustrates the arrangement where light-sensing means 60" analysing circuit 62" and control device 64" control an external device, which in this case is merely a signal lamp 70 to indicate the condition of light homogeneity, and thereby the range of the scene.

Figure 12:
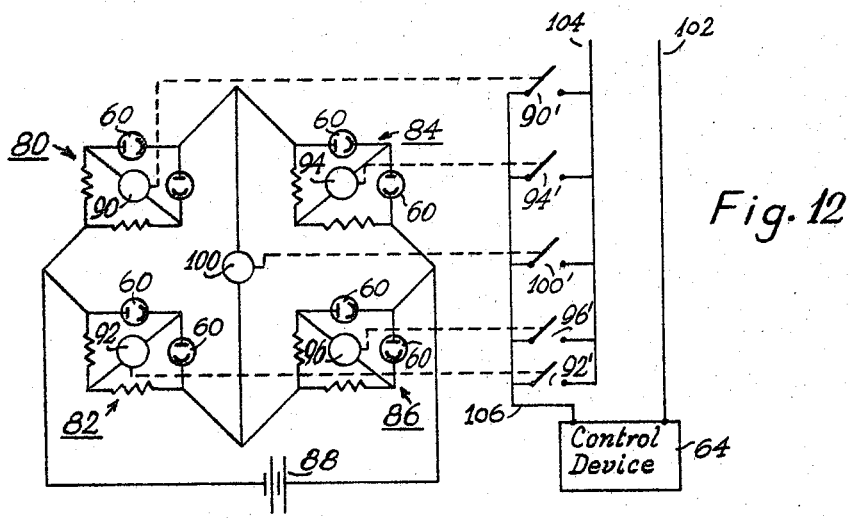

FIG. 12 schematically illustrates one example of an analysing circuit which could be used in the foregoing arrangements. This analysing circuit is based on the Wheatstone bridge principle and comprises a bridge network having four legs 80, 82, 84 and 86. A battery 88 is connected across one pair of legs. Unbalance of the bridge network is sensed by a current-sensing device, such as a relay 100, across the other pair of legs of the bridge. Each of the legs of the bridge in turn is constituted by another bridge network, in which the photocells 60 are in two legs, the balance or unbalance of each of these bridges being detected by a current-sensitive device, such as relay 90, 92, 94 and 96, respectively. Each of the relays 90, 92, 94, 96 and 100 (for the overall bridge) control electrical contacts 90', 92', 94', 96' and 100', respectively, which could be electronic switches, such that the respective contacts are closed if any current flows through the relay coil. A power source is connected by lead 102 to the control device 64, and the other lead 104 from the power source is connected to a third lead 106, by means of all the above contacts arranged in parallel, lead 106 being in turn connected to the control device.

The arrangement is such that so long as any of the photocells 60 receives light which is unequal in intensity with respect to any of the others, current will flow through one of the relay coils, whereupon control device 64 will be connected to the power source. The control device may be an electric motor or an electric clutch, which effects the movement of the variable element in the optical system, such as the position of the aperture or the focal length of the converging system, when automatic focusing is involved. It could also perform any electrically initiated function. Now as soon as the light intensities sensed by all the photocells are equal, all the bridges will be balanced. None of the relay coils will thus transmit current, and all the relay contacts will be open. Under this condition, the control device 64 is disconnected from the power source, whereupon the varying of the variable element discontinues.

This arrangement is actually of Wheatstone bridges arranged on the arms of a similar parent bridge. It is possible to increase the number of cells to any desired amount by arranging such parent bridges on the arms of still larger like ones, and so on to any desired amount. Any existing current in the relay bridges could be employed, mainly by amplification, for instance by the use of transistor amplifiers. Many such amplification units can be connected in parallel so that only when there is no current in any of these relay bridges, will the current to the control device cease.

Figure 13:
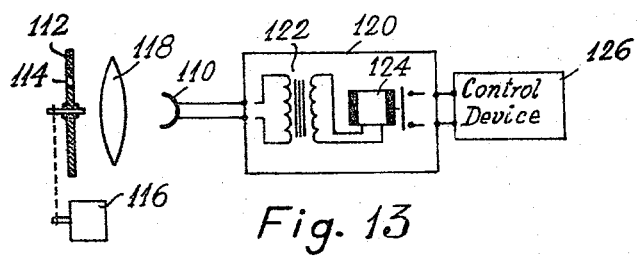

FIG. 13 illustrates another form of arrangement for examining for light homogeneity. In this arrangement, means are provided for effecting a scanning by one (or several) photocells of the different portions of the space examined for light homogeneity. At each location examined, an electrical signal is generated by the photocell in accordance with the light intensity at that location. Thus, the photocell produces an electrical output varying in accordance with the electrical signals produced by the photocell at each of the locations scanned.

The photocell in FIG. 13 is generally indicated by the reference numeral 110. It itself could be moved to scan, but preferably it is fixed, and a rotating scanning disc 112 is used having a scanning aperture 114. Scanning disc 112 is rotated continuously by a motor 116 and its aperture 114 scans the different locations, and transmits the light received by it through a lens 118 to the photocell.

Many types of analysing devices could be employed, the following including means for sensing whether the electrical output is constant or varying. The analysing means in FIG. 13 comprises a voltage inductor, namely a voltage transformer 122, which generates a voltage so long as the electrical output from photocell 110 is not constant. Thus, so long as light homogeneity is not found, a variable output will be produced, generating a voltage in the secondary of transformer 122. This energizes a relay 124 controlling a control device 126. As soon as light homogeneity is found, no voltage output is generated in the secondary of transformer 122, whereupon relay 124 is de-energized, disconnecting the control device 126.

Figure 14:
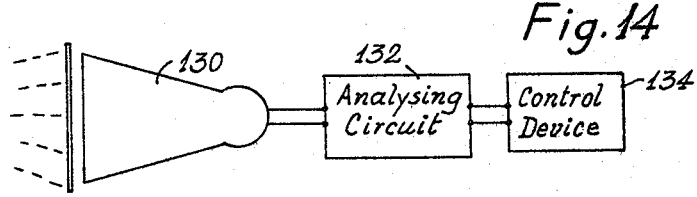

FIG. 14 illustrates a still further arrangement, wherein the light-sensitive means comprises a television pick-up tube 130 which generates an output to an analysing circuit 132, which in turn controls a control device 134. The analysing means for this arrangement could be similar to the last mentioned ones.

It will be appreciated that many other arrangements could be used for sensing for light homogeneity, for example those based on optical character recognition systems, and for controlling the optical device and/or an external device in response thereto.

The foregoing equations have been derived from known optical equations, and are believed to be accurate, but I do not wish to be bound by them as they are not absolutely necessary for practicing the invention or various features thereof. My computations from which these equations were derived are quite lengthy, and therefore have been omitted for the sake of conciseness.

In the preceding discussion, the use of a screen within the space of light homogeneity has been indicated, but it will be appreciated that usually the screen could be omitted, and the light-receiving means (e.g. the photocells), positioned so as to receive the light directly. Other modifications will readily suggest themselves. Also, certain of the disclosed features could be used without others and in other applications.

It will therefore be understood that the present invention is not limited to the given examples and the other details described above and illustrated in the drawings, but can be carried out with various modifications without departing from the spirit or scope of the invention as defined in the following claims.

I claim:

1. A device for indicating the range of a scene comprising an optical system including optical converging means located to receive light rays from the scene, optical aperture means located to receive light rays from said scene conveyed to it at least by part of said optical converging means, the optical system being such that light rays from all portions of the scene overlap in a predetermined space behind said optical aperture means when the optical aperture means is located so as to be effective at the image plane of the scene, said optical aperture means when located as said producing homogeneous light in said predetermined space, and light-receiving means for examining said space for homogeneity of light to provide an indication thereby of the range of said scene.

2. A device as defined in claim 1, wherein the optical system includes an anterior aperture.

3. A device as defined in claim 2 wherein the light-receiving means is located at the image plane of the anterior aperture and is within the image of the said anterior aperture.

4. A device as defined in claim 1, wherein the optical system includes an anterior aperture and the optical converging means comprises an anterior converging sub-system, and a posterior converging sub-system, the said optical aperture means constituting the posterior aperture, the anterior converging sub-system serving mainly to focus the scene onto the effective plane of said posterior aperture, the posterior converging sub-system serving mainly to focus the effective plane of the anterior aperture onto the light-receiving means for examining said space for homogeneity of light.

5. A device as defined in claim 4, wherein the aperture setting plane of the anterior converging sub-system coincides with the effective plane of the anterior aperture.

6. A device as defined in claim 1, wherein the optical aperture means is a pin-hole aperture.

7. A device for indicating the range of a scene, comprising, optical converging means located to receive light rays from the scene, optical aperture means located to receive light rays from said scene conveyed to it at least by part of said optical converging means, said optical aperture means having a smaller effective aperture than the optically equivalent aperture of said optical converging means at the optically effective plane of the latter, said optical aperture means when located so that its effective aperture is at the image plane of the scene producing homogeneous light in a predetermined space behind said optical aperture means, and light-receiving means for examining said predetermined space for homogeneity of light to provide an indication thereby of the range of said scene.

8. A device for indicating the range of a scene including an optical system, comprising, optical converging means located to receive light rays from the scene, optical aperture means located so as to be effective at the image plane of the scene, the optical system being such that light rays from all portions of the scene overlap in a predetermined space behind said optical aperture means when the latter is positioned so as to be effective at the image plane of the scene, whereby homogeneous light is produced in said predetermined space when said optical aperture means is located as said, means permitting the varying of at least one of said optical means to vary the relation between the plane of the image of said scene and the said optical aperture means, and light-receiving means for examining said predetermined space for homogeneity of light to provide an indication thereby of the range of said scene.

9. A device as defined in claim 8, wherein the focal length of the optical converging means is fixed, and the relative distance between same and said optical aperture means is variable and provides the indication of the range when said homogeneity is attained.

10. A device as defined in claim 8, wherein the focal length of the optical converging means is variable and provides the indication of the range when said homogeneity is attained.

11. A device as defined in claim 8, wherein control means are provided operative in response to the light-receiving means for varying the relation between the plane of the image of said scene and said optical aperture means until homogeneity of light is attained.

References Cited
UNITED STATES PATENTS 3,143,588   8/1964   Donald et al.

RONALD I. WIBERT, Primary Examiner

V. P. McGRAW, Assistant Examiner